United States Patent
Smith et al.

(10) Patent No.: US 7,462,664 B2
(45) Date of Patent: Dec. 9, 2008

(54) POLYVINYLBUTYRAL INTERLAYER SHEET WITH IMPROVED ADHESION TO GLASS AND A PROCESS FOR PREPARING SAME

(75) Inventors: Rebecca L. Smith, Vienna, WV (US); Donald L. Rymer, Little Hocking, OH (US); Robert M. Harper, Belpre, OH (US); Dan J. McKiernan, Parkersburg, WV (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 252 days.

(21) Appl. No.: 10/519,670

(22) PCT Filed: Jul. 29, 2003

(86) PCT No.: PCT/US03/23817

§ 371 (c)(1),
(2), (4) Date: Dec. 27, 2004

(87) PCT Pub. No.: WO2004/011538

PCT Pub. Date: Feb. 5, 2004

(65) Prior Publication Data

US 2005/0234185 A1  Oct. 20, 2005

Related U.S. Application Data

(60) Provisional application No. 60/400,231, filed on Jul. 31, 2002.

(51) Int. Cl.
B32B 27/30 (2006.01)
(52) U.S. Cl. .......................... 524/400; 524/433; 524/436
(58) Field of Classification Search ................. 524/400, 524/433, 436
See application file for complete search history.

(56) References Cited

U.S. PATENT DOCUMENTS

| | | | |
|---|---|---|---|
| 3,153,009 A | 10/1964 | Rombach | |
| 3,249,489 A | 5/1966 | Lavin et al. | |
| 3,249,490 A | 5/1966 | Lavin et al. | |
| 4,292,372 A | 9/1981 | Moynihan | |
| 4,952,457 A | 8/1990 | Cartier et al. | |
| 5,427,861 A | 6/1995 | D'Errico | |
| 6,383,647 B1 * | 5/2002 | Shohi et al. | 428/437 |
| 6,387,516 B2 | 5/2002 | Shichiri et al. | |
| 6,599,630 B1 | 7/2003 | Fugiel et al. | |
| 7,074,487 B2 | 7/2006 | Shichiri et al. | |
| 7,165,362 B2 | 1/2007 | Jobs et al. | |

FOREIGN PATENT DOCUMENTS

| | | |
|---|---|---|
| EP | 1 022 261 A1 | 7/2000 |
| EP | 1 036 775 B1 | 9/2000 |
| JP | (HEI)02-212140 | 8/1990 |
| JP | 11-343152 | 12/1999 |
| JP | 2000-302490 | 10/2000 |
| JP | 2001-106555 | 4/2001 |
| JP | 2001-163540 | 5/2001 |
| JP | 2001-240435 | 9/2001 |
| JP | 60210551 | 4/2005 |
| JP | 07172878 | 5/2005 |
| JP | 07237943 | 5/2005 |
| WO | WO 99/61243 | 12/1999 |
| WO | WO 00/18698 | 4/2000 |

OTHER PUBLICATIONS

European Patent Office Communication Pursuant to Article 115(2) EPC—Third Party Observations Against European Counterpart Patent Application EP 1 529 074, including Annex 1.
English Translation of Table 2 of D2 (JP 2000-302490) Submitted With Observations.
English Translation of Table 2 of D3 (JP 2001-106555) Submitted With Observations.
JP 07237943 Abstract.
JP 07172878 Abstract.
JP 60210551 Abstract.
Japanese Patent Office Communication—Information Offer Form for Japanese Counterpart Application 2004-524200.
English translation of Official Notice of Rejection mailed on Jul. 8, 2008 for counterpart Japanese Patent Application No. 2004-524200.

* cited by examiner

*Primary Examiner*—Peter D Mulcahy

(57) ABSTRACT

The present invention is an improved PVB composition comprising an adhesion control agent which is a mixture of potassium and magnesium salts in a ratio of from about 0.05:1 to about 5:1, by weight, potassium salts to magnesium salts. The present invention also describes a method for improved control of adhesion of PVB to glass.

25 Claims, No Drawings

POLYVINYLBUTYRAL INTERLAYER SHEET WITH IMPROVED ADHESION TO GLASS AND A PROCESS FOR PREPARING SAME

This application claims the benefit of U.S. Provisional Application No. 60/400,231, filed Jul. 31, 2002.

BACKGROUND OF THE INVENTION

Plasticized polyvinyl butyral (PVB) sheet is used in the manufacture of laminate structures such as, for example: windshields for vehicles including automobiles, motorcycles, boats and airplanes; homes and buildings; shelving in cabinets and display cases; and other articles where structural strength is desirable in a glass sheet.

Laminated safety glass comprises a sandwich of polyvinyl acetal sheeting, typically polyvinyl butyral sheeting, between sheets (lites) of glass. These laminated glass composites are required to perform to stringent requirements including good impact performance, weatherability, and transparency.

A recent design trend toward the use of laminated safety glass in open edge windshield applications and in automobile sidelites has necessitated the need for laminated glass with improved adhesion robustness. In these open edge applications, the edge of the windshield is not encased with a gasket, but is exposed to the environment. Exposure of a PVB interlayer to the environment can result in moisture being absorbed into the interlayer. Moisture absorbed into the interlayer can affect the adhesion of the interlayer to the glass, and thereby cause defects in the laminate.

Japanese Kokai Publication Hei 7-172878 describes an interlayer with alternating sheets of specialized PVB constructed in order to improve the moisture robustness of the laminate. Japanese Kokai Publication 60-210551 describes the use of silicon oils in PVB sheeting, and Japanese Kokai Publication Hei 7[1995]-237943 describes the use of organic acids in PVB sheeting to improve moisture robustness.

The use of magnesium alone as an adhesion control agent is well known. For example, WO 9961243 describes the use of magnesium salts alone as adhesion control agents. However, one problem with using magnesium alone as an adhesion control agent is that it can yield asymmetric adhesion depending upon the structure of the glass laminate. U.S. Pat. No. 6,383,647 describes adhesion control agents. U.S. Pat. No. 4,292,372 describe the use of potassium and magnesium salts as adhesion control agents for PVB. U.S. Pat. Nos. 3,249,490 and 3,249,489 describe the use of mixtures of alkali and alkaline earth metal salts as adhesion control agents. However, the Applicant has discovered that the ratio of potassium ions to magnesium ions present in a PVB composition is an important parameter for improving adhesion robustness in a PVB laminate. The importance of the ratio of potassium ions to magnesium ions and the effect of the ratio of said salts on adhesion robustness in a PVB laminate has not been fully appreciated or described in the art.

It would be desirable to have improved control over adhesion robustness of PVB to glass in a laminate by controlling the ratio of potassium ions to magnesium ions.

SUMMARY OF THE INVENTION

In one aspect, the present invention is a method for controlling adhesion of PVB to glass in a glass/PVB laminate comprising the step:mixing an adhesion control agent with PVB and a plasticizer to obtain a plasticized PVB composition, wherein the adhesion control agent comprises a mixture of potassium and magnesium salts in a ratio that is in the range of from about 0.05:1 to about 5:1 (weight:weight, potassium ions:magnesium ions) and wherein the salts are included in a concentration of up to about 1000 ppm based on the total weight of the plasticized PVB composition.

Preferably the ratio is about 1:1 to about 5:1. more preferably the ratio is about 2:1 to about 5:1, even more preferably the ratio is about 3:1 to about 5:1, and most preferably the ratio is about 4:1 to about 5:1.

The salts are preferably included in a total concentration of from about 200 to about 1000 ppm, more preferably about 250 to about 900 ppm, and most preferably about 300 to about 800 ppm.

In another aspect, the present invention is a plasticized polyvinylbutyral (PVB) composition having from about 17 wt % to about 23 wt % residual hydroxyl, plasticizer in an amount of from about 30 to about 50 parts per hundred (pph) PVB, and an adhesion control agent comprising a mixture of potassium and magnesium salts in a ratio that is in a range of from about 0.05:1 to about 5:1 (weight:weight, potassium ions:magnesium ions) and wherein the salts are included in a total concentration of up to about 1000 ppm.

DETAILED DESCRIPTION OF THE INVENTION

In one embodiment, the present invention is a plasticized PVB composition comprising an adhesion control package that is a mixture of potassium and magnesium salts. The adhesion control package is a mixture of salts combined in a weight ratio of from about 0.05:1 to about 5:1 (weight potassium ions:weight magnesium ions). Below a ratio of 0.05:1 a laminate may exhibit asymmetric adhesion, depending on the construction of the glass. Above a ratio of 5:1 the laminate may exhibit low adhesion along the edge of a laminate wherein moisture has been absorbed along the periphery, as measured by the edge pummel test. Preferably the salts are added in a ratio in the range of from about 1:1 to about 5:1, more preferably the salts are mixed in a ratio in the range of from about 1.5:1 to about 4.5:1, even more preferably the salts are added in a ratio in the range of from about 2:1 to about 4:1. Most preferably the salts are added in a ration in the range of from about 3:1 to about 4:1.

Salts of the present invention can be potassium or magnesium salts of various counterions. Potassium and/or magnesium salts suitable for use in the practice of the present invention can be potassium or magnesium salts formed in combination with either organic or inorganic anionic counterions. Salts of organic acids having from 2 to 22 carbon atoms can be preferable. For example, preferred for use in the practice of the present invention are carboxylate salts obtained from acids selected from the group consisting of: acetic; formic; citric; stearic; 2-ethyl hexanoic, 2-ethyl butyric, heptanoic, propanoic, pentanoic, hexanoic, heptanoic, lauric, and the like.

The adhesion control salt mixture can be included in some finite amount, but less than 1000 parts per million (ppm) based on the total weight of the PVB composition. In the practice of the present invention when the salt concentration is above about 1000 ppm total salt, the adhesion of the PVB to glass can be at an undesirable level—generally lower than desired.

One method for measuring adhesion robustness is the so-called "edge pummel test". A laminate is considered to have a good edge pummel result, and thus acceptable adhesion robustness, if after testing, the laminate has a uniform pummel value across the laminate, that is, no bare vinyl along the edges. A passing result is one wherein the pummel value decreases by not more than 2 units from the center of the laminate (center) to the edge of the laminate (edge). Preferable performance is not more than a 1 pummel unit difference from the center to the edge and most preferably, there is no difference in the pummel measurements between the center and edge.

Another method of measuring adhesion is compressive shear test. As determined by the compressive shear test, adhesion of a laminate of the present invention is within the range of from about 965 to about 1800 N/cm$^2$ (1400-2600 psi). Preferably adhesion is in the range of from about 1000 N/cm$^2$ to about 1775 N/cm$^2$, more preferably from about 1200 N/cm$^2$ to about 1750 N/cm$^2$. Most preferably adhesion is from about 1240 N/cm$^2$ to about 1730 N/cm$^2$.

PVB of the present invention can have from about 30 to about 50 parts per hundred (pph) of a plasticizer, based upon the total dry weight of the resin. Plasticizer can be added in any compatible amount desirable to obtain a plasticized PVB sheet. Preferably, the present invention can have from about 30 to about 45 pph of plasticizer, more preferably from about 30 to about 40 pph plasticizer, and most preferably from about 32 to about 45 pph plasticizer. The "dry weight" as used herein refers to the weight of the dry resin, that is, after water has been removed from the resin.

Plasticizers of the present invention can be chosen from any that are known or used conventionally in the manufacture of plasticized PVB sheeting compositions. Preferred plasticizers for use herein are diesters obtained by the reaction of triethylene glycol or tetraethylene glycol with aliphatic carboxylic acids having from 6 to 10 carbon atoms; and diesters obtained from the reaction of sebacic acid with aliphatic alcohols having from 1 to 18 carbon atoms. More preferably the plasticizer is either tetraethylene glycol di(2-heptanoate) (4G7), triethylene glycol di(2-ethylhexanoate) (3GO) or dibutyl sebacate (DBS). Most preferably the plasticizer is 3GO.

The PVB composition of the present invention has from about 17% to about 23 wt % residual hydroxyl. Preferably, the hydroxyl content is from about 18 to about 21%, more preferably from about 18 to about 20.5%, and most preferably from about 18.5% to about 19.5%. The hydroxyl value can affect the compatibility of the plasticizer in the PVB, as well as other properties of the PVB. Generally, and without being held to the absolute accuracy of the following statement, the lower the hydroxyl content, the more compatible the plasticizers preferred for use in the practice of the present invention.

The present invention can require the use of a surfactant. Surfactants suitable for use herein include: sodium lauryl sulfate; ammonium lauryl sulfate; sodium dioctyl sulfosuccinate; ammonium perfluorocarboxylates having from 6 to 12 carbon atoms; sodium aryl sulfonates, adducts of chlorinated cyclopentadiene and maleic anhydride; partially neutralized polymethacrylic acid; alkylaryl sulfonates; sodium N-oleyl-N-methyl taurate; sodium alkylaryl polyether sulfonates; triethanolamine lauryl sulfate; diethyl dicyclohexyl ammonium lauryl sulfate; sodium secondary-alkyl sulfates; sulfated fatty acid esters; sulfated aryl alcohols; and the like. Preferable surfactants include sodium lauryl sulfate, sodium dioctyl sulfosuccinate, sodium cocomethyl tauride, and decyl(sulfophenoxy)benzenesulfonic acid disodium salt. Most preferable is sodium dioctyl sulfosuccinate (DOSS).

The surfactant can be included in any effective amount for the particular set of process conditions practiced. The Applicants have found that an effective amount is at least 0.1 parts per hundred (pph) by weight, based on the weight of PVA. For example, the surfactant can be included in an amount of from about 0.10 to about 0.70 pph by weight.

Optional additives can be included in a resin composition of the present invention. Such additives include, for example, antioxidants, light stabilizers, and/or surface tension controlling agents.

U.S. Pat. No. 3,153,009, for example, describes a process for manufacturing PVB suitable for use in the practice of the present invention, and is incorporated herein by reference. PVB resins suitable for the practice of the present invention can be prepared by mixing polyvinyl alcohol (PVA) with butyraldehyde in an aqueous medium in the presence of an acid or mixture of acids, at a temperature of from about 5° C. to about 100° C.

A PVB sheet can be obtained from PVB resin described herein by either an extrusion process or by a co-extrusion process, as is conventionally known in the art. For example, a PVB sheet can be obtained from the PVB resin of the present invention by co-extruding the resin, plasticizer, and/or other optional additives at a temperature of from about 175° C. to about 225° C.

EXAMPLES

The following Examples and comparative examples are presented to further illustrate the present invention. The Examples are not intended to limit the scope of the invention in any manner, nor should they be used to define the claims or specification in any manner that is inconsistent with the invention as claimed and/or as described herein.

The following tests were used in the examples and comparative examples below.

Edge Pummel (Moisture Resistance) Test: A laminate is placed in a hot, humid environment (95% RH, 50° C.) for 2 weeks. After the 2 week period, the laminate is conditioned to −18° C. for a minimum of 3 hours. The chilled laminate is held at a 45° angle on a metal plate and struck with a 227 g (0.5 lb) hammer until the glass was broken. The amount of bare PVB at the edges was measured (in mm) and is reported as the laminate's edge pummel.

Compressive Shear Adhesion Test: The compressive shear strength is determined by sawing a laminate into six 2.54 cm×2.54 cm chips. The chips are held in a jig at 45° and a compression testing instrument is used to place force on the chip at the rate of 0.25 cm/min. The amount of force to cause cohesive failure of the glass-PVB bond is the compressive shear strength of the laminate.

Hydroxyl number is determined according to procedures described in ASTM D 1396-92.

PVB resin containing a residual hydroxyl level between 18-23 wt % were blended with either 3GO or 4G7 plasticizers and a mixture of alkali and alkaline earth metal salts for adhesion control and formed into sheeting. The PVB sheeting was then laminated and subjected to the edge pummel test. Results are given in Table 1. In Examples 1-18, the adhesion of the PVB sheeting to glass was within the necessary range for windshield adhesion (1150-1800 N/cm$^2$). Examples 19 and 20 describe formulations that yield acceptable edge pummel results but yield windshield adhesion significantly higher than acceptable for windshields (>3990 N/cm$^2$). The ratio column describes the ratio (weight to weight) of potassium ions to magnesium ions added to the sheeting.

Comparative Example 1

The polyvinyl butyral interlayer used in this example was prepared by blending 38 parts tetraethyleneglycol diheptanoate (4G7) plasticizer per hundred parts of resin in an extruder. Magnesium formate was added as the adhesion control agent. The resultant sheeting was laminated and tested by the edge pummel test. Results are given in Table 1. Despite the acceptable edge pummel results, this laminate may possibly exhibit asymmetrical adhesion.

Comparative Example 2

The polyvinyl butyral interlayer of this example was prepared according to the procedure of Example 1 except that the plasticizer used was triethyleneglycol di-2-ethylhexanoate (3GO) and the adhesion control agent was magnesium 2-ethylbutyrate. Results of the edge pummel test are given in Table 1. Despite the acceptable edge pummel results, this laminate may possibly exhibit asymmetrical adhesion.

Example 3

The polyvinyl butyral interlayer of this example was prepared according to the procedure of Example 1 except that the adhesion control agent was a mixture of potassium formate and magnesium acetate where the potassium to magnesium ratio was 2:1. Results of the edge pummel test are given in Table 1.

Example 4

The polyvinyl butyral interlayer of this example was prepared according to the procedure of Example 1 except that the plasticizer was triethyleneglycol di-2-ethylhexanoate and the adhesion control agent was a mixture of potassium formate and magnesium acetate where the potassium to magnesium ratio was 3:1. Results of the edge pummel test are given in Table 1.

Example 5

The polyvinyl butyral interlayer of this example was prepared according to the procedure of Example 1 except that the adhesion control agent was a mixture of potassium formate and magnesium acetate where the potassium to magnesium ratio was 3:1. Results of the edge pummel test are given in Table 1.

Example 6

The polyvinyl butyral interlayer of this example was prepared according to the procedure of Example 1 except that the plasticizer was 3GO and the adhesion control agent was a mixture of potassium formate and magnesium 2-ethylbutyrate where the potassium to magnesium ratio was 3:1. Results of the edge pummel test are given in Table 1.

Example 7

The polyvinyl butyral interlayer of this example was prepared according to the procedure of Example 1 except that the plasticizer was 3GO and the adhesion control agent was a mixture of potassium acetate and magnesium acetate where the potassium to magnesium ratio was 3:1. Results of the edge pummel test are given in Table 1.

Example 8

The polyvinyl butyral interlayer of this example was prepared according to the procedure of Example 1 except that the plasticizer was 3GO and the adhesion control agent was a mixture of potassium acetate and magnesium 2-ethylbutyrate where the potassium to magnesium ratio was 3:1. Results of the edge pummel test are given in Table 1.

Example 9

The polyvinyl butyral interlayer of this example was prepared according to the procedure of Example 1 except that the adhesion control agent was a mixture of potassium formate and magnesium acetate where the potassium to magnesium ratio was 4:1. Results of the edge pummel test are given in Table 1.

Example 10

The polyvinyl butyral interlayer of this example was prepared according to Example 1 except that the adhesion control agent was a mixture of potassium formate, potassium acetate, and magnesium acetate where the total potassium to magnesium ratio was 5:1. Results of the edge pummel test are given in Table 1.

Example 11

The polyvinyl butyral interlayer of this example was prepared according to Example 1 except that the plasticizer was triethyleneglycol di-2-ethylhexanoate and the adhesion control agent was a mixture of potassium formate and magnesium 2-ethylbutyrate where the potassium to magnesium ratio was 5:1. Results of the edge pummel test are given in Table 1.

Comparative Example 12

The polyvinyl butyral interlayer of this example was prepared according to Example 1 except that the plasticizer was triethyleneglycol di-2-ethylhexanoate and the adhesion control agent was a mixture of potassium acetate and magnesium acetate where the potassium to magnesium ratio was 7:1. Results of the edge pummel test are given in Table 1.

Comparative Example 13

The polyvinyl butyral interlayer of this example was prepared according to Example 1 except that the adhesion control agent was a mixture of potassium formate and magnesium formate where the potassium to magnesium ratio was 10:1. Results of the edge pummel test are given in Table 1.

Comparative Example 14

The polyvinyl butyral interlayer of this example was prepared according to Example 1 except that the adhesion control agent was a mixture of potassium formate and magnesium neodecanoate where the potassium to magnesium ratio was 11:1. Results of the edge pummel test are given in Table 1.

Comparative Example 15

The polyvinyl butyral interlayer of this example was prepared according to Example 1 except that the adhesion control agent was a mixture of potassium formate and magnesium 2-ethylhexanoate where the potassium to magnesium ratio was 12:1. Results of the edge pummel test are given in Table 1.

Comparative Example 16

The polyvinyl butyral interlayer of this example was prepared according to Example 1 except that the adhesion control agent was a mixture of potassium formate and magnesium sulfate where the potassium to magnesium ratio was 25:1. Results of the edge pummel test are given in Table 1.

Comparative Example 17

The polyvinyl butyral interlayer of this example was prepared according to Example 1 except that the plasticizer was triethyleneglycol di-2-ethylhexanoate and the adhesion control agent was a mixture of potassium formate and magnesium 2-ethylbutyrate where the potassium to magnesium ratio was 25:1. Results of the edge pummel test are given in Table 1.

Comparative Example 18

The polyvinyl butyral interlayer of this example was prepared according to Example 1 except that the adhesion control agent was a mixture of potassium formate and magnesium sulfate where the potassium to magnesium ratio was 105:1. Results of the edge pummel test are given in Table 1.

Comparative Example 19

They polyvinyl butyral interlayer of this example was prepared according to Example 1 except that the plasticizer was triethyleneglycol di-2-ethylhexanoate and the adhesion control agent was a mixture of potassium acetate and magnesium acetate where the potassium to magnesium ratio was 3:1. However, the interlayer of this example is not acceptable for use in windshields since the adhesion levels was >1800 N/cm$^2$.

Comparative Example 20

They polyvinyl butyral interlayer of this example was prepared according to Example 1 except that the plasticizer was triethyleneglycol di-2-ethylhexanoate and the adhesion control agent was a mixture of potassium acetate and magnesium acetate where the potassium to magnesium ratio was 3:1. However, the interlayer of this example is not acceptable for use in windshields since the adhesion levels was >1800 N/cm$^2$.

TABLE 1

| | Ratio (K:Mg) | Potassium Salt | Magnesium Salt | Salt Level, ppm | % Hydroxyl | Plasticizer | Bare Vinyl, mm |
|---|---|---|---|---|---|---|---|
| Example | | | | | | | |
| 3 | 2:1 | Formate | Acetate | 429 | 22 | 4G7 | 0 |
| 4 | 3:1 | Formate | Acetate | 504 | 18.5 | 3GO | 0 |
| 5 | 3:1 | Formate | Acetate | 509 | 22 | 4G7 | 0 |
| 6 | 3:1 | Formate | 2-Ethyl butyrate | 671 | 18.5 | 3GO | 0 |
| 7 | 3:1 | Acetate | Acetate | 559 | 18.5 | 3GO | 0 |
| 8 | 3:1 | Acetate | 2-Ethyl butyrate | 722 | 18.5 | 3GO | 0 |
| 9 | 4:1 | Formate | Acetate | 392 | 22 | 4G7 | 0 |
| 10 | 5:1 | Formate/Acetate | Acetate | 498 | 22 | 4G7 | 0 |
| 11 | 5:1 | Formate | 2-Ethyl butyrate | 551 | 18.5 | 3GO | 0 |
| Comparative Examples | | | | | | | |
| 1 | 0:1 | | Formate | 380 | 23 | 4G7 | 0 |
| 2 | 0:1 | | 2-Ethyl butyrate | 452 | 18.5 | 3GO | 0 |
| 12 | 7:1 | Acetate | Acetate | 451 | 18.5 | 3GO | 5 |
| 13 | 10:1 | Formate | Formate | 660 | 23 | 4G7 | 9 |
| 14 | 11:1 | Formate | Neodecanoate | 1162 | 23 | 4G7 | 10 |
| 15 | 12:1 | Formate | 2-Ethyl hexanoate | 1202 | 23 | 4G7 | 8 |
| 16 | 25:1 | Formate | Sulfate | 470 | 22 | 4G7 | 11 |

What is claimed is:

1. A plasticized polyvinyl butyral composition containing polyvinyl butyral having from about 17 wt % to about 23 wt % residual hydroxyl, plasticizer in an amount of from about 30 to about 50 parts per hundred (pph) polyvinyl butyral, and an adhesion control agent comprising a mixture of potassium and magnesium salts in a ratio that is in a range of from about 4:1 to about 5:1 (weight:weight, potassium:magnesium), wherein the salts are included in a total concentration of up to about 1000 parts per million (ppm) based on the total weight of the composition.

2. A plasticized polyvinyl butyral composition containing polyvinyl butyral having from about 17wt % to about 23wt % residual hydroxyl, tetraethylene glycol di(2-heptanoate) plasticizer in an amount of from about 30 to about 50 parts per hundred (pph) polyvinyl butyral, and an adhesion control agent comprising a mixture of potassium and magnesium salts in a ratio that is in a range of from about 2:1 to about 5:1 (weight:weight, potassium:magnesium), wherein the salts are included in a total concentration of up to about 1000 parts per million (ppm) based on the total weight of the composition.

3. The plasticized polyvinyl butyral composition of claim 2 wherein the ratio is from about 3:1 to about 5:1.

4. The plasticized polyvinyl butyral composition of claim 3 wherein the ratio is from about 4:1 to about 5:1.

5. The plasticized polyvinyl butyral composition of claim 1 wherein the salts are included in a total concentration of from about 200 to about 1000 ppm.

6. The plasticized polyvinyl butyral composition of claim 2 wherein the salts are included in a total concentration of from about 200 to about 1,000 ppm.

7. The plasticized polyvinyl butyral composition of claim 1 wherein the salts are included in a total concentration of from about 300 to about 800 ppm.

8. The plasticized polyvinyl butyral composition of claim 2 wherein the ratio is from about 3:1 to about 5:1.

9. The plasticized polyvinyl butyral composition of claim 8 wherein the ratio is from about 4:1 to about 5:1.

10. The plasticized polyvinyl butyral composition of claim 1 wherein the magnesium salt is a carboxylate salt obtained from an acid selected from the group consisting of acetic acid, formic acid, citric acid, stearic acid, 2-ethyl hexanoic acid, 2-ethyl butyric acid, heptanoic acid, propanoic acid, pentanoic acid, hexanoic acid, heptanoic acid and lauric acid.

11. The plasticized polyvinyl butyral composition of claim 1 wherein the potassium salt is a carboxylate salt obtained from an acid selected from the group consisting of acetic acid, formic acid, citric acid, stearic acid, 2-ethyl hexanoic acid, 2-ethyl butyric acid, heptanoic acid, propanoic acid, pentanoic acid, hexanoic acid, heptanoic acid, and lauric acid.

12. The plasticized polyvinyl butyral composition of claim 10 wherein the potassium salt is a carboxylate salt obtained from an acid selected from the group consisting of acetic acid, formic acid, citric acid, stearic acid, 2-ethyl hexanoic acid, 2-ethyl butyric acid, heptanoic acid, propanoic acid, pentanoic acid, hexanoic acid, heptanoic acid, and lauric acid.

13. The plasticized polyvinyl butyral composition of claim 1 wherein the plasticizer is selected from the group consisting of diesters obtained by the reaction of triethylene glycol or tetraethylene glycol with aliphatic carboxylic acids having from 6 to 10 carbon atoms, and diesters obtained from the reaction of sebacic acid with aliphatic alcohols having from 1 to 18 carbon atoms.

14. The plasticized polyvinyl butyral composition of claim 12 wherein the plasticizer is selected from the group consisting of tetraethylene glycol di(2-heptanoate) (4G7), triethylene glycol di(2-ethylhexanoate) (3GO) or dibutyl sebacate (DBS).

15. The plasticized polyvinyl butyral composition of claim 1 wherein the plasticizer is triethylene glycol di(2-ethylhexanoate).

16. The plasticized polyvinyl butyral composition of claim 12 wherein the plasticizer is triethylene glycol di(2-ethylhexanoate).

17. The plasticized polyvinyl butyral composition of claim 12 wherein the plasticizer is dibutyl sebacate (DBS).

18. The plasticized polyvinyl butyral composition of claim 13 wherein the plasticizer is contained in an amount of about 30 to about 45 pph polyvinyl butyral.

19. The plasticized polyvinyl butyral composition of claim 14 wherein the plasticizer is contained in an amount of about 30 to about 40 pph polyvinyl butyral.

20. The plasticized polyvinyl butyral composition of claim 14 wherein the plasticizer is contained in an amount of about 32 to about 45 pph polyvinyl butyral.

21. The plasticized polyvinyl butyral composition of claim 1 wherein the polyvinyl butyral has about 18 wt % to about 21 wt % residual hydroxyl.

22. The plasticized polyvinyl butyral composition of claim 14 wherein the polyvinyl butyral has about 18.5 wt % to about 19.5 wt% residual hydroxyl.

23. The plasticized polyvinyl butyral composition of claim 1 further containing about 0.10 to about 0.70 pph by weight surfactants selected from the group consisting of sodium lauryl sulfate; ammonium lauryl sulfate; sodium dioctyl sulfosuccinate; ammonium perfluorocarboxylates having from 6 to 12 carbon atoms; sodium aryl sulfonates, adducts of chlorinated cyclopentadiene and maleic anhydride; partially neutralized polymethacrylic acid; alkylaryl sulfonates; sodium N-oleyl-N-methyl taurate; sodium alkylaryl polyether sulfonates; triethanolamine lauryl sulfate; diethyl dicyclohexyl ammonium lauryl sulfate; sodium secondary-alkyl sulfates; sulfated fatty acid esters; sulfated aryl alcohols; and the like.

24. The plasticized polyvinyl butyral composition of claim 14 further containing about 0.10 to about 0.70 pph by weight of polyvinyl butyral of surfactant selected from the group consisting of sodium lauryl sulfate, sodium dioctyl sulfosuccinate, sodium cocomethyl tauride, and decyl(sulfophenoxy) benzenesulfonic acid disodium salt.

25. The plasticized polyvinyl butyral composition of claim 16 further containing about 0.10 to about 0.70 pph by weight of polyvinyl butyral of sodium dioctyl sulfosuccinates.

* * * * *